United States Patent [19]

Shimada et al.

[11] 4,110,394

[45] Aug. 29, 1978

[54] PROCESS FOR EXTRUSION FORMING OF RESIN FORMED BODY HAVING DIFFERENT THICKNESS

[75] Inventors: Teizo Shimada, Takatsuki; Takeshi Kita, Asaka; Kiyoshi Mochizuki, Joyo; Takahiro Komiya, Kamifukuoka, all of Japan

[73] Assignee: Sekisui Kagaku Kogyo Kabushiki Kaisha, Osaka, Japan

[21] Appl. No.: 685,604

[22] Filed: May 12, 1976

[30] Foreign Application Priority Data

May 16, 1975 [JP] Japan .................................. 50-59032

[51] Int. Cl.² ............................................ B29D 23/04
[52] U.S. Cl. .................................. 264/167; 264/40.7; 264/90; 264/209; 425/377; 425/465
[58] Field of Search ................. 264/167, 90, 209, 40.7; 425/377, 465

[56] References Cited

U.S. PATENT DOCUMENTS

| 3,928,519 | 12/1975 | Kashiyama et al. ................. 264/167 |
| 3,989,779 | 11/1976 | Brunnhofer ....................... 264/210 F |
| 4,036,930 | 7/1977 | Murai et al. .......................... 264/167 |

*Primary Examiner*—Jay H. Woo
*Attorney, Agent, or Firm*—Sughrue, Rothwell, Mion, Zinn and Macpeak

[57] ABSTRACT

In a process for forming a resin body, the thickness of the body is altered by altering the feed rate of raw material to an extruder and the screw rate of the extruder screw in such a relationship to alter the quantity extrusion rate without altering the amount of resin within the extruder.

5 Claims, 6 Drawing Figures

PROCESS FOR EXTRUSION FORMING OF RESIN FORMED BODY HAVING DIFFERENT THICKNESS

BACKGROUND OF THE INVENTION

This invention relates to a process for producing a resin body having several thicknesses by varying the thickness of the formed body during the extrusion process.

Previously, when a resin formed body having different thicknesses is to be produced by an extrusion process, the thickness is altered by increasing or decreasing the take-up speed of the formed body extruded during the extrusion forming process. In such a process, however, the compression or tension forces acting on the body being extruded vary during the readjustment of dimension or during cooling, resulting in wrinkles or cracks in the formed body. Alternatively, the compression or tension remains as a strain causing an unfavorable effect on the products produced.

Also, in such a process, the take-up speed cannot be varied by more than 50 % without detrimentally affecting the resin body formed. Thus it is difficult to change the thickness by a large amount. Moreover, there is tendency for the transient portions from the thin portion to the thick portion or the reverse thereto to become longer.

SUMMARY OF THE INVENTION

It is therefore an object of the present invention to eliminate the above-mentioned disadvantages, and accordingly, the invention is directed to a process for producing resin formed bodies by fitting a die at the tip end of the extruder and continuously extruding resin from said die, wherein said wall thickness is altered by coordinating changes in the feed rate of raw material to the extruder and the screw rotation rate without varying substantially the amount of resin within the extruder.

BRIEF DESCRIPTION OF THE DRAWINGS

FIGS. 2 through 5 are diagrammatic representations showing, with the lapse of time, the relations between the quantity extrusion rate (Q), the feed rate of raw material into the extruder (F), the driving speed of the extruding screws (N) and the raw material filling rate of the extruder (K), and in which FIGS. 2 and 3 show the cases where the process according to the present invention is carried out, and FIGS. 3 and 4 show comparative examples.

DETAILED DESCRIPTION OF THE INVENTION

Figure 1:
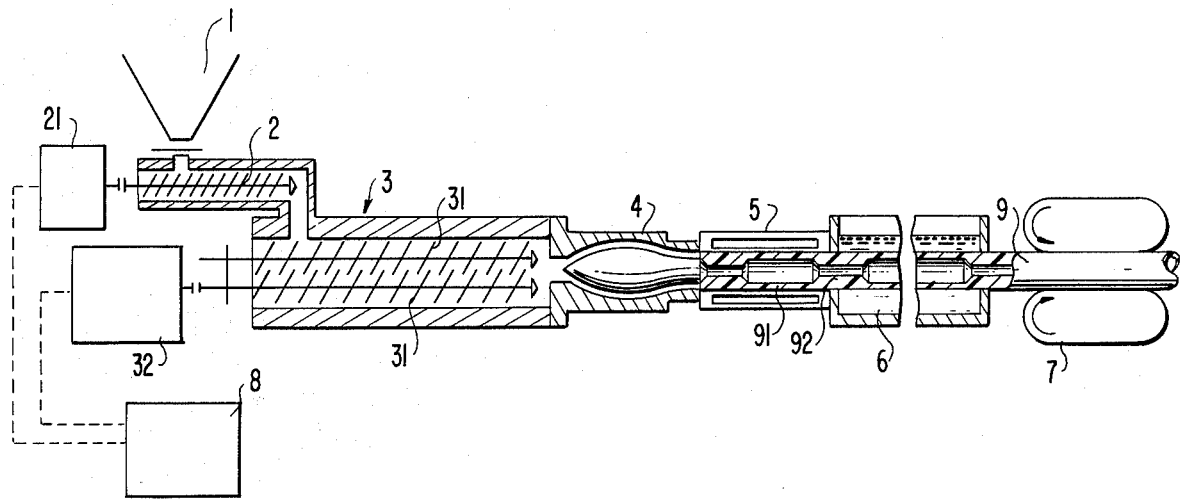
FIG. 1 is a sectional view showing diagrammatically apparatus useful in practicing the process according to the present invention.
Figure 2:
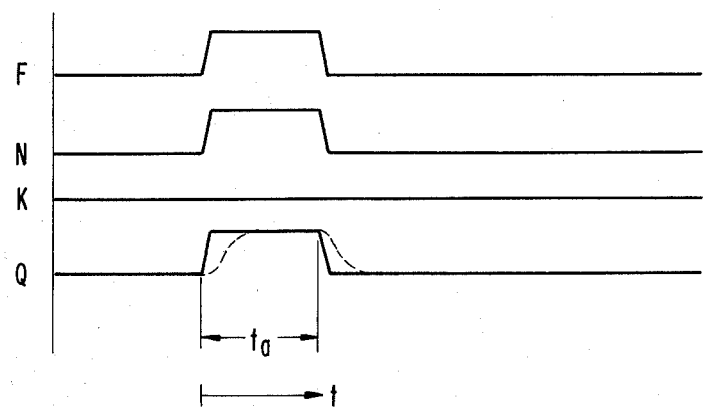
Figure 3:
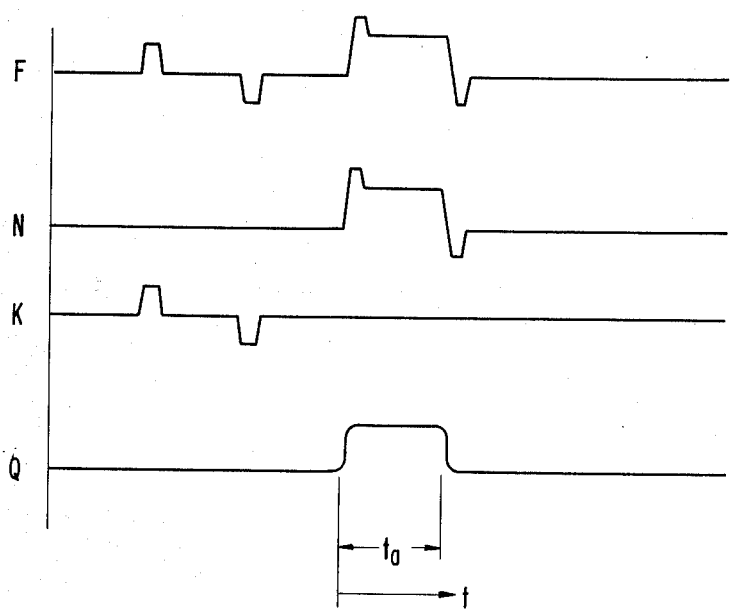

FIG. 1 is a diagrammatical drawing, in sectional view, of an example showing a mode of operation when a pipe is to be produced in accordance with the present invention. In the drawing, the numeral 2 designates a means for feeding raw material, 3 an extruder, 4 a die, 5 a means for readjusting the outer diameter, 6 a cooling water tank, and 7 a take-up machine.

Resin material in a pulverized or granular form is fed from a hopper 1 to extruder 3 by means of the material feeding means 2. The synthetic resin is mixed and melted in the extruder 3, pushed out, in a tubular form, through the die 4, passed through the outer diameter readjusting means 5, cooled in the water tank 6, and taken up by the take-up machine 7.

The material feeding means 2 may comprise a screw feed as shown in the drawing and also may use a rotary feed instead of the screw feed. In either case, the screw or rotary feed is driven by the driving means 21 to feed raw material to the extruder 3.

The extruder 3 is so constructed that a plurality of extruding screws 31, 31 are arranged in a barrel and are engaged with each other. The screws 31, 31 are rotated by the driving means 32, and the resin material is mixed and melted and is extruded into tubular form through the die 4. The rotation driving means 32 for the screws 31, 31 and the driving means 21 for said raw material feeding means 2 are so adapted that their driving speeds can be varied with a predetermined relation by means of a control device 8.

That is, when the rotating speed of the screws 31, 31 of the extruder 3 is increased or decreased, the quantity of material fed thereto is increased or decreased by varying the driving speed of the material feeding means 2. Thus it is possible to adjust the filling rate of the material resin so as to remain substantially constant in the extruder 3. Then, the rotating speed of the screws 31, 31 of the extruder 3 is increased to about twice the usual speed by the control device 8 for a predetermined period of time at predetermined intervals during the extrusion process. At this moment, the feed quantity of material from the material feeding means is increased in response to the rotating speed of the screws in the extruder 3 such that about twice the quantity of molten resin is extruded in tubular form from the die 4 without changing substantially the material filling rate in the extruder 3, whereby the outer diameter is adjusted by the outer diameter adjusting means 5 without changing the take-up speed of the pipe 9 in the take-up machine 7, so that the radial thickness is increased and a thickened portion is formed having about twice the thickness of the tube prior to increasing the screw and the feed rates.

It is preferable to provide grooves in the outer diameter readjusting means 5 for the purpose of causing the pipe 9 to come into closer contact with the inner surface of the outer diameter readjusting means 5. The grooves are connected to an evacuating pipe for evacuating the air existing between the pipe 9 and the inner face of the outer diameter readjusting means 5. The same effect can also be obtained by feeding a pressurized fluid into the pipe 9.

In this way, a pipe 9 can be formed continuously, having radially thin portions 91 and thick portions 92 alternatingly. It is also possible to produce a trough shaped plate shaped articles having different wall thicknesses in the extruding direction by using a die 4 having a trough shaped gap or a plate shaped gap, and by using corresponding readjusting means and cooling water tank.

In the process of the present invention, use is made of an extruder having a plurality of screws engaging each other, and the driving speed of the screws is varied without substantially changing the filling rate of the resin material in the extruder. Thus the process does not rely upon merely a change in the driving speed of the screws in the extruder, nor merely increasing or decreasing in the quantity of material resin being supplied into the extruder. As a result the quantity of molten resin extruded from the die is varied immediately and correctly in response to the variation of the driving speed of the screw, thereby desired thick or thin portions in a pipe wall can be formed easily.

Figure 4:
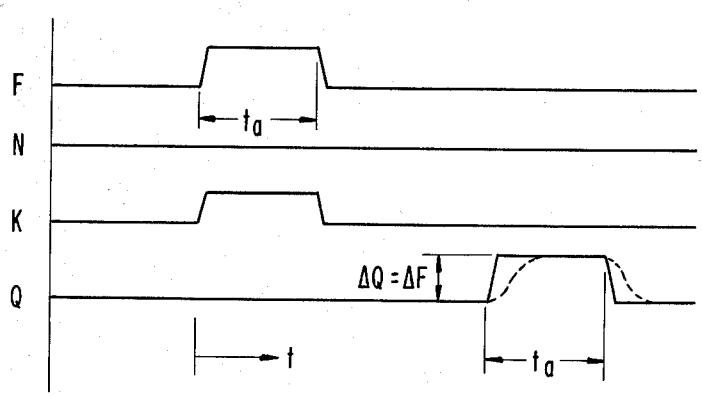
Figure 5:
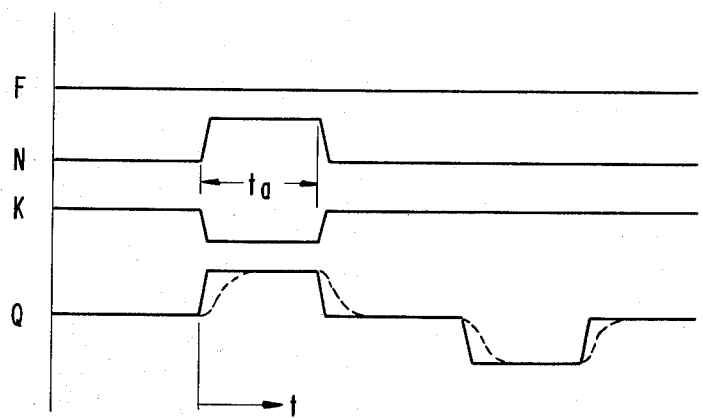

In FIGS. 2–5 the waveform diagrams are all plotted with time on the abscissa. F designates the feed rate of the resin into the extruder, N designates the driving speed of the extruder screws, K designates the material filling rate in the extruder, and Q designates quantity extrusion rate. FIGS. 4 and 5 illustrate the cases where only feed rate or the screw rate is increased. The effects on the extrusion rates are shown by curves Q in FIGS. 4 and 5. This is to be compared with the case illustrated in FIG. 2 wherein both feed rate and screw rate are altered. There is a substantially immediate change in the quantity extrusion rate thus providing much better control of the quantity extrusion rate than is available in the previous cases.

On the other hand, the response time of the quantity extrusion rate (Q) is actually apt to lag slightly as shown by the broken lines in the aforementioned Figures because of some change in the molten quantity of resin in the extrusion machine caused by the change in the flow resistance of molten resin flowing in the die with the variation in the quantity of extrusion, which in turn changes the back pressure of resin. Accordingly, in order to correct the lag in response time, it has been discovered that it is preferable to increase and then decrease the feed rate of raw material for short times before increasing the driving speed of the extrusion screws, and to subsequently drive the extrusion screws initially at a speed greater than the desired speed for a short time, and when restoring the screws to their original speed, to first decrease the speed thereof below that of the original speed of a short time.

With the process according to the present invention, thick or thin wall portions are formed by the increase and decrease in the quantity of extrusion, so that no excessive stresses such as compressive or drawing force are applied at the time of dimensional readjustment or cooling. Accordingly no wrinkles or cracks will be produced in the products, and products will be excellent in appearance. Furthermore the transient portions from the thick portion to the thin portion or from the thin to the thick portion can be shortened, whereby the rate of thickness variation can be taken, for example, as large as 90–100 % for the reference thickness which is the usual rate of producing pipes.

What is claimed is:

1. In a resin body extrusion process of the type wherein resin raw material is fed into an extruder wherein an extruder screw means mixes, melts and moves said resin therethrough to a shape forming means, and wherein said body is pulled by a take-up means, an improved process for altering the thickness of said resin body comprising, altering the feed rate of resin raw material into said extruder, and altering the screw rotation rate of said extruder by amounts to maintain the quantity of resin within the extruder substantially constant while varying significantly the quantity extrusion rate leaving said extruder.

2. The process of claim 1 further comprising, prior to said last mentioned altering steps, briefly increasing the feed rate of resin material and then briefly decreasing the feed rate of raw material.

3. The process of claim 2 wherein the alteration of said feed rate is carried out by increasing the feed rate above the desired altered feed rate, then reducing the feed rate to the desired feed rate, and wherein the alteration of said screw rotation rate is carried out by increasing the screw rate above the desired altered screw rate, then reducing the screw rate to the desired screw rate, the latter steps being carried out substantially simultaneously with the former steps.

4. The process of claim 3 further comprising the steps of reducing the feed rate and the screw rate below their respective initial rates and then raising the feed rate and the screw rate to their respective initial rates.

5. The process of claim 1 wherein the take-up rate of said take-up means is maintained substantially constant at all times.

* * * * *